United States Patent [19]

Bhattacharyya deceased et al.

[11] Patent Number: 5,093,413

[45] Date of Patent: Mar. 3, 1992

[54] CATIONIC POLYMERS FOR SLUDGE DEWATERING

[75] Inventors: Bhupati R. Bhattacharyya, deceased late of; Downers Grove; by Uma Bhattacharyya, Downers Grove, legal representative; John W. Sparapany, Bolingbrook; Yvonne O. Dunn, Naperville; Foster Michael H., Geneva, all of Ill.

[73] Assignee: Nalco Chemical Company, Naperville, Ill.

[21] Appl. No.: 664,558

[22] Filed: Mar. 4, 1991

[51] Int. Cl.$^5$ .............................. C08F 2/32; C08J 3/00; C08K 5/20; C08L 43/00
[52] U.S. Cl. ................................ 524/801; 524/535; 524/555; 524/728; 524/804; 526/82; 526/292.2; 526/307.3; 526/307.5
[58] Field of Search ............... 524/801, 804, 535, 555, 524/728; 526/82, 292.2, 307.3, 307.5

[56] References Cited

U.S. PATENT DOCUMENTS

| | | | |
|---|---|---|---|
| 4,060,678 | 11/1977 | Steckler | 526/292.2 |
| 4,307,215 | 12/1981 | Goretta et al. | 526/213 |
| 4,734,205 | 3/1988 | Jacques et al. | 210/708 |
| 4,741,835 | 5/1988 | Jacques et al. | 210/708 |
| 4,783,513 | 11/1988 | Cadel et al. | 526/216 |
| 4,835,234 | 5/1989 | Valint et al. | 526/258 |
| 4,931,191 | 6/1990 | Braden et al. | 210/725 |
| 4,968,435 | 11/1990 | Neff et al. | 210/734 |

*Primary Examiner*—Paul R. Michl
*Assistant Examiner*—Patrick Niland
*Attorney, Agent, or Firm*—Dressler, Goldsmith, Shore, Sutker & Milnamow

[57] ABSTRACT

Water-in-oil emulsion polymers of cationic acrylamides to which are added small quantities of a hydroxyalkyl methacrylate and sodium formate. These polymers are useful as flocculants in sludge dewatering processes.

17 Claims, No Drawings

CATIONIC POLYMERS FOR SLUDGE DEWATERING

FIELD OF THE INVENTION

The present invention relates to water-in-oil emulsion polymers of cationic acrylamides. These polymers are useful as flocculants in sludge dewatering processes.

BACKGROUND OF THE INVENTION

Water-soluble copolymers of acrylamide and dimethylaminopropylacrylamide are known. U.S. Pat. No. 3,647,769 teaches the formation of a copolymer of acrylamide and acrylonitrile followed by reaction with amines. Polymers of this type have a very high molecular weight and correspondingly very high viscosities in water. In order to be able to ship such aqueous polymers in commerce, very dilute solutions would be required which is impractical. Preparation of these copolymers via a process known as water-in-oil emulsion polymerization is described in U.S. Pat. No. 4,391,932. The water-in-oil emulsions contain polymers of very high molecular weight, but since the continuous phase is an oil in which the polymers are not soluble, they are characterized by high solids content at low to moderate viscosities. These water-in-oil emulsions readily inverted in water to produce water solutions of the polymer at the site where they are to be used, usually in a very diluted form. The preparation of water-in-oil emulsions has also been described in U.S. Pat. No. 3,284,393. The "inversion" process in water has been described in U.S. Pat. No. 3,624,019. These techniques have been employed in the production of polymers useful in the treatment of the waste streams of the paper and mining industries as well as municipal aqueous waste streams as described in U.S. Pat. No. 4,391,932.

SUMMARY OF THE INVENTION

This invention relates to water-in-oil emulsions of cationic copolymers of acrylamide modified in structure and performance characteristics by the addition of small quantities of a hydroxyalkyl (meth)acrylate and a chain transfer agent in the polymerization stage of their manufacture. These cationic polymers comprise copolymers of acrylamide and dimethylaminoethyl(meth)acrylate quaternary salts such as a dimethylaminoethylacrylate methyl chloride quaternary salt (DMAEA*MCQ).

The term "dimethylaminoethyl(meth)acrylate" as used herein includes dimethylaminoethylacrylate, dimethylaminoethylmethacrylate and mixtures thereof.

The term "quaternary salt" as used herein contemplates the use of any conventional quaternizing agent, as for example, methyl halides such as methyl chloride and dimethyl sulfate.

The polymers of this invention are produced by a water-in-oil emulsion polymerization process. The resultant water-in-oil emulsions may be readily inverted into a water solution by admixture with water to form a water solution of the polymer.

Preferred hydroxyalkyl methacrylates include 2-hydroxyethyl methacrylate (HEMA) and 2-hydroxypropyl methacrylate.

Preferred chain transfer agents include sodium formate, 2-mercaptoethanol, isopropanol, and the like.

The polymers of this invention are useful as retention aids in the manufacture of paper and as dewatering agents for municipal and industrial aqueous waste materials.

DETAILED DESCRIPTION OF THE INVENTION

We have found that the incorporation of small amounts of a chain transfer agent such as sodium formate, (about 0.01 to about 0.075 weight %) and a hydroxyalkyl (meth)acrylate such as HEMA (about 0.1% to about 0.75 mole %) during the polymerization process produces cationic copolymers of acrylamide having improved performance in the dewatering of waste activated sludges (municipal and chemical process industries), as compared with standard cationic polymers which have not been modified with sodium formate and hydroxyethyl methacrylate (HEMA).

The improved performance is characterized by:

1. more efficient flocculation and free water separation from the sludge at lower and/or higher polymer dosage;
2. floc strength is improved and;
3. less cationic charge is require for effective conditioning of the sludge.

Flocculant sludge conditioning performance is generally a function of such things as molecular weight, coil volume, solvent nature, charge, branching and cross-linking (micro-structure) and substrate properties. Hydrodynamic volume or the molecular size of the polymer along with sludge-polymer mixing energy has been shown to play an important role in the sludge conditioning activity. While high molecular weight essentially linear polymers are known, to be shear sensitive, polymers of DMAEA*MCQ/acrylamide and small amounts of a hydroxylalkyl methacrylate and sodium formate form floc faster (lower initial capillary suction time [CST time]) and the floc is stronger as the floc could withstand more mixing (shearing) and still maintain free water separation.

Polymers of the present invention have had micro- and/or macro-structure modifications. It is theorized that the presence of sodium formate causes a chain transfer process to occur during polymerization when HEMA is utilized in combination with sodium formate, the effect on the performance is substantial while the intrinsic viscosity (IV) or Reduced Specific Viscosity (RSV) remains relatively unchanged. Since only small changes in the IV of the modified polymers have been found, it may be assumed that the large differences seen in performance are not the result of small molecular weight or hydrodynamic volume variations. The performance of these polymers in treating sludge, however, does show differences which can only be attributable to some change(s) in the polymer micro-structure or macro-structure which are not related to the molecular weight.

THE WATER-IN-OIL EMULSIONS OF WATER SOLUBLE VINYL ADDITION POLYMERS

The water-in-oil emulsions of water soluble vinyl addition polymers useful in this invention contain four basic components. These components and their weight percentages in the emulsion are listed below:

A. Water soluble vinyl addition polymer:
  1. Generally from 5–60%
  2. Preferably from 20–40%; and
  3. Most preferably from 25–35%;
B. Water:
  1. Generally from 20–90%;

2. Preferably from 20–70%; and
3. Most preferably from 30–55%;
C. Hydrophobic liquid:
 1. Generally from 5–75%;
 2. Preferably from 5–40%; and
 3. Most preferably from 20–30%; and
D. Water-in-oil emulsifying agent:
 1. Generally from 0.1–21%;
 2. Preferably from 1–15%; and
 3. Most preferably from 1.2–10%.

It is also possible to further characterize the water-in-oil emulsions of the water soluble vinyl addition polymers of the present invention with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsion also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5 to 14, and most preferably from 1.0 to 2.75.

THE WATER SOLUBLE VINYL ADDITION POLYMERS

The water soluble vinyl addition polymers of the present invention are copolymers of acrylamide (AcAm, 50–70 mole %) and a cationic monomer such as dimethylaminoethylacrylate methyl chloride quaternary salt (DMAEA*MCQ, 30–50 mole %), a hydroxyalkyl (meth)acrylate preferably hydroxyethyl methacrylate (HEMA, 0.1–0.75 mole %) and chain transfer agent (0.01–0.75 weight %). The chain transfer agent can be sodium formate, 2-mercaptoethanol, isopropanol or longer chain alkyl alcohols that can be used as surfactants in the preparation of the inverse latex emulsion. Polymers prepared according to this invention generally have molecular weights higher than 100,000, and more preferably above several million. A preferred copolymer of the present invention has a molecular weight of approximately 5,000,000. A particularly preferred copolymer has an intrinsic viscosity (IV) of approximately 7.0 to 13.0, and a reduced specific viscosity (RSV) of about 10.0 to 18.0.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branched-chain isoparaffinic solvent sold by Humble Oil and Refinery Company under the trade name "Isopar M" described in U.S. Pat. No. 3,624,019 and a paraffinic solvent sold by the Exxon Company U.S.A. called "low Odor Paraffinic Solvent." Typical specifications of this material are set forth in Table I on the next page.

TABLE I

| | |
|---|---|
| Specific Gravity 60 deg./60 deg. F. | 0.780–0.806 |
| Color, (Gardner) | ≦1 |
| Appearance, visual | Colorless and Clear |
| Distillation, deg. F., ASTM D-86 | |
| IBP | 334 min. |
| FBP | 520 max. |
| Flash Point, deg. F., TCC | 170 min. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzenes, xylenes, toluene, and other water immiscible hydrocarbons having a low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

PREPARATION OF THE WATER-IN-OIL EMULSIONS OF WATER SOLUBLE VINYL ADDITION POLYMERS

The general method for the preparation of emulsions of the type described above is contained in U.S. Pat. No. 3,284,393 and in U.S. Pat. No. 4,391,932, which are incorporated by reference. A typical procedure for preparing water-in-oil emulsions of this type includes preparing an aqueous solution of water soluble vinyl addition monomers and sodium formate, and adding this solution to one of the hydrocarbon oils described above. With the addition of a suitable water-in-oil emulsifying agent and under agitation, the emulsion is then subjected to free radical polymerization conditions and a water-in-oil emulsion of the water soluble vinyl addition polymer is obtained. It should be pointed out that the ingredients are chosen based upon the weight percentages given above and their compatibility with each other. As to the choice of free radical catalyst, it may be either oil or water soluble and may be selected from the group consisting of organic peroxides, Vazo-type materials, redox-type initiator systems, etc. Additionally, ultraviolet light, microwaves, and other actinic, ionizing, or heat producing radiation sources will also cause the polymerization of water-in-oil emulsions of this type.

In the manufacture of emulsions of this type, the use of air may be employed to control polymerization. This technique is described in U.S. Pat. No. 3,767,629, which is also incorporated by reference. Also of interest is U.S. Pat. No. 4,024,097 which describes the use of particular surfactant systems for the water-in-oil emulsions which allow for the preparation of latexes having small particle sizes and improved storage stability. Various oil-soluble polymers, as described in U.S. Pat. No. 3,915,920, may be utilized to provide superior stabilized emulsions. Of still further interest in U.S. Pat. No. 3,997,492 which describes the formation of water-in-oil emulsions of the type above described utilizing emulsifiers having HLB values of between 4–9.

PHYSICAL PROPERTIES OF THE WATER-IN-OIL EMULSIONS

The water-in-oil emulsions of the finely divided water soluble cationic polymers useful in this invention contain relatively large amounts of polymer. The polymers dispersed in the emulsion are quite stable when the particle size of the polymer is in the range of about 0.1 microns to about 5 microns, preferably within the range of about 0.2 microns to about 5 microns, and most preferably within the range of about 0.2 to about 2.0 microns.

The emulsions prepared having the above composition generally have a viscosity in the range of from about 500 to 2000 cps. It will be seen, however, that the viscosity of these emulsions can be affected greatly by increasing or decreasing the polymer content, oil content, or water content, as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered.

Additional water-in-oil surfactant which is to be added generally is in the range of about 1–10% and preferably about 1–5% by weight of the cationic polymer. Due to the fact that the copolymer contains a cationic charge, an emulsifier should be selected which is compatible with this tYpe of material. Selection of surfactants for this purpose must, however, unfortunately be made on a trial and error method. Useful surfactants include sorbitan monooleate (Span 80) and Tween 61, a sorbitan monostearate.

A water soluble surfactant may optionally be added to the water-in-oil emulsion of the cationic acrylamide copolymer. This water soluble surfactant is used to invert the water-in-oil emulsion when it is added to water and thus cause the rapid solubilization of the polymer contained therein for its ultimate use in the application chosen.

THE INVERSION OF THE WATER-IN-OIL EMULSIONS OF THE WATER SOLUBLE VINYL ADDITION POLYMERS

The water-in-oil emulsions of the water soluble polymers discussed above have the ability to rapidly invert when added to aqueous solution in the presence of an inverting agent or physical stress. Upon inversion, the emulsion releases the polymer into water in a very short period of time when compared to the length of time required to dissolve a solid form of the polymer. The most convenient means resides in the use of a surfactant added to either the polymer containing emulsion or the water into which it is to be placed. The placement of a surfactant into the water causes the emulsion to rapidly invert and release the polymer in the form of an aqueous solution. When this technique is used to invert the polymer containing emulsion, the amount of surfactant present in the water may vary over a range of 0.01 to 50% based on the polymer. Good inversion often occurs within the range of 0.5 to 10% based on the polymer.

The preferred surfactants utilized to cause the inversion of the water-in-oil emulsion of this invention when the emulsion is added to water are hydrophilic and are further characterized as being water soluble. Any hydrophilic-type surfactant, such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide.

EXAMPLE 1

Synthesis of Polymer

This example illustrates the formation of a 30:70 mole % (DMAEA*MCQ) dimethylaminoethylacrylate methyl chloride quaternary salt: acrylamide copolymer water-in-oil emulsion.

To a reactor equipped with stirrer, nitrogen sparge tube, condenser, and addition funnel, were added 778.5 parts of LOPS, 15.6 parts of Tween 61, a sorbitan monostearate and 46.7 parts of Span 80, a sorbitan monooleate. This mixture was then stirred rapidly at 1000 rpm and an aqueous phase consisting of 500.4 parts of acrylamide, 605.9 parts of DMAEA*MCQ, 2.8 parts of sodium formate, 1115.4 parts of water and adipic acid (46.7 parts) as a buffering agent were then added slowly to form a water-in-oil emulsion. The resulting suspension was spared with nitrogen while heating to 46° C. After 30 minutes, to the resultant water-in-oil emulsion was added 1.2 parts of Vazo 64, a free radical initiator. After the ensuing initial exotherm, the reactor temperature was maintained at 47+/−¼° C. for four hours while stirring. The reaction mixture was then heated to 65° C. for one hour and then cooled to room temperature.

The resultant water-in-oil emulsion of the DMAEA*MCQ/AcAM copolymer contained 35% solids. The polymer in aqueous solution had an intrinsic viscosity of 12.9 and a reduced specific viscosity (RSV) of 17.8. This product is labeled "D" in Table II in Example 2.

EXAMPLE 2

Additional Polymers

TABLE II

Experimental DMAEA*MCQ/AcAm Conformational Polymers
(all at 35% solids)

| Sample | AcAM (mole %) | Cationic (mole %) | Na Formate (wt %) | HEMA (mole %) | RSV (0.045) | IV | Huggins Constant |
|---|---|---|---|---|---|---|---|
| A | 70 | 30 | — | — | 19.3 | 16.7 | 0.21 |
| B | 70 | 30 | 0.025 | — | 22.0 | 16.4 | 0.93 |
| C | 70 | 30 | — | 0.25 | 12.1 | 7.6 | 1.70 |
| D | 70 | 30 | 0.025 | 0.25 | 17.8 | 12.9 | 0.63 |
| E | 70 | 30 | 0.025 | 0.50 | 10.5 | 7.7 | 1.00 |
| F | 70 | 30 | — | 0.50 | 10.5 | 7.4 | 1.30 |
| G | 84 | 16 | 0.010 | — | 24.2 | 14.9 | 0.93 |
| H | 84 | 16 | 0.050 | — | 16.4 | 12.3 | 0.60 |
| I | 84 | 16 | — | 0.50 | 11.9 | 8.4 | 1.14 |
| J | 84 | 16 | 0.025 | 0.50 | 15.1 | 11.7 | 0.54 |
| K | 70 | 30 | 0.012 | 0.12 | 20.2 | — | — |
| L | 70 | 30 | 0.0375 | 0.37 | 14.1 | — | — |
| M | 70 | 30 | 0.0375 | 0.12 | 14.4 | — | — |
| N* | 70 | 30 | 0.0 | 0.25 | 17.3 | — | — |
| U | 70 | 30 | 0.025 | 0.75 | 16.3 | 15.3 | 0.10 |
| V | 70 | 30 | 0.05 | 0.75 | 10.9 | 9.1 | 0.48 |

*Sample N prepared with emulsifiers which are known to chain transfer more than the emulsifiers used previously.

Changes in polymer RSV (reduced specific viscosity) are observed when using a chain transfer agent in the polymerization reaction. In the case of DMAEA*MCQ/AcAm copolymers, sodium formate (0.01 to 0.025 wt. %) can increase the RSV of the polymer, but the IV remains relatively unchanged. Sodium formate levels of about 0.010 to 0.025 wt. % appear to increase the RSV of the polymer while a sodium formate level of 0.05 wt % causes a reduction in polymer RSV and IV. It is thought that the addition of sodium formate of up to about 0.025 wt % reduces the long chain branching and crosslinking which can occur during the polymerization reaction.

TABLE III

| Sample | AcAm (mole %) | Cationic (mole %) | Na Formate (wt %) | Acrylate Type | Acrylate (mole %) | RSV (0.045) | IV | Huggins Constant |
|---|---|---|---|---|---|---|---|---|
| O | 70 | 30 | 0.00 | HPMA* | 0.25 | 13.9 | 9.5 | 0.95 |
| P | 70 | 30 | 0.01 | HPMA | 0.25 | 22.5 | 17.7 | 6.34 |
| Q | 70 | 30 | 0.00 | HEA** | 0.25 | 2.4 | 1.4 | >1.0 |
| R | 70 | 30 | 0.01 | HEA | 0.25 | 4.3 | 3.0 | >1.0 |
| S | 70 | 30 | 0.00 | HPA*** | 0.25 | 4.3 | 2.8 | >1.0 |
| T | 70 | 30 | 0.01 | HPA | 0.25 | 6.9 | 6.0 | 0.67 |

*HPMA = hydroxypropyl methacrylate
**HEA = hydroxyethyl acrylate
***HPA = hydroxypropyl acrylate Performance of Polymers Free drainage and capillary suction time (CST) tests were used to evaluate the polymer's sludge conditioning performance. The free drainage test is used to measure the amount of water released from a polymer treated sludge sample. Inverted polymer is mixed with a specific volume of sludge and after formation of the floc, the sample is poured onto a filter. The volume of water which drains from the floc mixture is measured at 5, 10, and 15 second intervals. Normally the 10 second free drainage volumes are used for relative comparison of polymer performances, but the 5 or 15 second volumes can also be used. The cake quality as well as the filtrate clarity are also used to distinguish performance differences between polymers. In general, a high water drainage at lower polymer dosages indicates a very efficient polymer.

The CST test is used to measure the relative speed at which floc is formed and how well free water release is maintained while the polymer-sludge mixture is subjected to shear (mixing) energy. The relative floc strength can also be determined using this method. In general, the lower the CST, the faster the floc is formed and the stronger the floc. For the evaluation of the polymers in Table IV, 0.3% polymer solutions were used. The volume of the polymer solution and the amount of free drainage were recorded.

TABLE IV

Polymer Testing Results
(dose vs 10 second drainage volume)

| Sample | Sludge Type | Dose ml. (drainage ml.) | | | | | |
|---|---|---|---|---|---|---|---|
| A | Chem. Plant 1. | 4.0 (25) | 4.5 (45) | 5.0 (64) | 6.0 (55) | | |
| F | " | 4.5 (45) | 5.0 (64) | 6.0 (90) | 7.0 (125) | 8.0 (130) | |
| D | " | 3.0 (40) | 3.5 (55) | 4.0 (100) | 5.0 (130) | | |
| E | " | 3.5 (40) | 4.0 (60) | 5.0 (85) | 6.0 (85) | | |
| B | " | 3.0 (35) | 4.0 (65) | 5.0 (90) | 6.0 (100) | | |
| D | Chem. Plant 2. | 4 (75) | 5 (100) | 6 (115) | 7 (120) | 8 (125) | 9 (120) |
| C | " | 8 (55) | 9 (90) | 10 (115) | 11 (130) | 12 (135) | |
| F | " | 11 (80) | 12 (100) | 13 (120) | 14 (135) | | |
| I | Mun. Plant 1. | 40 (20) | 46 (92) | 47 (90) | | | |
| J | " | 15 (40) | 17 (65) | 20 (115) | | | |
| A | Chem. Plant 3. | 1 (60) | 1.5 (100) | 2 (130) | 3 (05) | | |
| N | " | 1 (60) | 1.5 (100) | 2 (135) | 3 (155) | | |
| K | " | 1 (60) | 1.5 (85) | 2 (105) | 3 (125) | | |
| L | " | | | 2 (60) | 3 (65) | 5 (70) | |
| M | " | | | 2 (55) | 3 (60) | 5 (65) | |
| A | Mun. Plant 2. | 0.5 (50) | 1.0 (95) | 1.5 (145) | 2.0 (160) | | |
| K | " | 0.5 (50) | 1.0 (90) | 1.5 (110) | 2.0 (130) | | |
| L | " | | 1.0 (85) | 1.5 (125) | 2.0 (155) | | |
| M | " | 0.5 (50) | 1.0 (105) | 1.5 (160) | 2.0 (185) | | |
| N | " | 0.5 (50) | 1.0 (90) | 1.5 (180) | 2.0 (195) | | |
| A | Mun. Plant 3. | 25 (35) | 30 (50) | | | | |
| D | " | 25 (35) | 30 (75) | 35 (110) | | | |

TABLE IV-continued

Polymer Testing Results
(dose vs 10 second drainage volume)

| Sample | Sludge Type | Dose ml. (drainage ml.) | | | |
|---|---|---|---|---|---|
| O | " | 25 (30) | 30 (35) | 35 (40) | 40 (30) |
| P | " | 25 (30) | 30 (30) | 35 (30) | 40 (30) |

In Chemical Plant #1., Polymer "D" is the more efficient polymer, producing greater water release at lower polymer dosages. The maximum water release is about the same as Polymer "F" indicating that both of these polymers are equally as effective in this application.

In Chemical Plant #2., Polymer "D" showed superior activity at low polymer dosages and maximum water release at about 80% of the dosage of Polymer "C" and 60% of the dosage of Polymer "F" in this application.

In Chemical Plant #3., polymer N showed superior activity at higher polymer dosages.

In Municipal Plant #1., the cationic flocculants showed a very narrow effective polymer dosage range. Polymer "J" performs at about 50% of the dosage of Polymer "I." Thus, Polymer "J" is considered to be a more efficient polymer.

In Municipal Plant #2., Polymer N showed superior activity at higher polymer dosages.

In Municipal Plant #3., Polymer D outperformed polymer A by achieving greater water release at higher dosages. Hydroxypropyl methacrylate polymer (Polymers O and P) showed some activity, but in comparison to Polymers A and D, the hydroxypropyl methacrylate chemistry was not as effective as hydroxyethyl methacrylate chemistry.

We claim:

1. A copolymer of acrylamide and a cationic monomer characterized by the incorporation of from about 0.1 to about 0.75 mole % of a hydroxyalkyl (meth)acrylate and from about 0.01 to about 0.075 weight % of a chain transfer agent during the polymerization process.

2. The copolymer of claim 1 wherein the cationic monomer is dimethylaminoethyl(meth)acrylate methyl chloride quaternary salt.

3. The copolymer of claim 1 wherein the hydroxyalkyl (meth)acrylate is 2-hydroxyethyl methacrylate.

4. The copolymer of claim 1 wherein the chain transfer agent is selected from the group of sodium formate, 2-mercaptoethanol and isopropanol.

5. The copolymer of claim 4 wherein the chain transfer agent is sodium formate.

6. A water-in-oil emulsion of a copolymer of acrylamide and a cationic monomer characterized by the incorporation of from about 0.1 to about 0.75 mole % of a hydroxyalkyl(meth)acrylate and from about 0.01 to 0.075 weight % of a chain transfer agent during the polymerization process.

7. The water-in-oil emulsion of claim 6 wherein the chain transfer agent is selected from the group of sodium formate, 2-mercaptoethanol and isopropanol.

8. The water-in-oil emulsion of claim 7 wherein the chain transfer agent is sodium formate.

9. The water-in-oil emulsion of claim 6 that comprises 50-70 mole % acrylamide and 30-50 mole % cationic monomer.

10. The water-in-oil emulsion of claim 7 that comprises:
   5-60% by weight copolymer;
   20-90% by weight water;
   5-75% by weight of an inert hydrophobic liquid; and
   0.1-21% by weight water-in-oil emulsifying agent.

11. The water-in-oil emulsion of claim 7 wherein the cationic monomer is a dimethylaminoethyl(meth)acrylate methyl chloride quaternary salt.

12. A method of dewatering sludge comprising adding to said sludge an effective amount of an inverted water-in-oil emulsion of a copolymer of acrylamide and a cationic monomer characterized by the incorporation of from about 0.01 to about 0.75 mole % of a hydroxyalkyl (meth)acrylate and from about 0.01 to about 0.075 weight % of a chain transfer agent during the polymerization process.

13. The method of claim 12 wherein the chain transfer agent is selected from the group of sodium formate, 2-mercaptoethanol and isopropanol.

14. The method of claim 13 wherein the chain transfer agent is sodium formate.

15. The method of claim 12 that comprises 50-70 mole % acrylamide and 30-50 mole % cationic monomer.

16. The method of claim 15 that comprises:
   5-60% by weight copolymer;
   20-90% by weight water;
   5-75% by weight of an inert hydrophobic liquid; and
   0.1-21% by weight water-in-oil emulsifying agent.

17. The method of claim 12 wherein the cationic monomer is a dimethylaminoethyl(meth)acrylate methyl chloride quaternary salt.

* * * * *

UNITED STATES PATENT AND TRADEMARK OFFICE
CERTIFICATE OF CORRECTION

PATENT NO. : 5,093,413
DATED : March 3, 1992
INVENTOR(S) : Bhupati R. Bhattacharyya, et. al.

It is certified that error appears in the above-indentified patent and that said Letters Patent is hereby corrected as shown below:

On the Title page, item [75],

Applicants hereby request that a Certificate of Correction be issued in reference to the above-identified application. The patent as issued is incorrect and that the first and last names of the inventor, Michael H. Foster have been transposed. The correct name of the inventor is Michael H. Foster, not Foster Michael H.

Signed and Sealed this

Seventeenth Day of August, 1993

Attest:

BRUCE LEHMAN

Attesting Officer

Commissioner of Patents and Trademarks